(12) United States Patent
Sprenger

(10) Patent No.: US 9,687,747 B2
(45) Date of Patent: Jun. 27, 2017

(54) GAMING DEVICE COMPRISING A VERTICAL HOUSING

(71) Applicant: NOVOMATIC AG, Gumpoldskirchen (AT)

(72) Inventor: Tobias Sprenger, Bingen (DE)

(73) Assignee: NOVOMATIC AG, Gumpoldskirchen (AT)

( * ) Notice: Subject to any disclaimer, the term of this patent is extended or adjusted under 35 U.S.C. 154(b) by 75 days.

(21) Appl. No.: 14/650,792

(22) PCT Filed: Dec. 12, 2013

(86) PCT No.: PCT/EP2013/076351
§ 371 (c)(1),
(2) Date: Jun. 9, 2015

(87) PCT Pub. No.: WO2014/090935
PCT Pub. Date: Jun. 19, 2014

(65) Prior Publication Data
US 2016/0184716 A1    Jun. 30, 2016

(30) Foreign Application Priority Data

Dec. 14, 2012  (DE) .................. 10 2012 112 341

(51) Int. Cl.
*A63F 13/90*  (2014.01)
*G07F 17/32*  (2006.01)

(52) U.S. Cl.
CPC .......... *A63F 13/90* (2014.09); *G07F 17/3216* (2013.01)

(58) Field of Classification Search
None
See application file for complete search history.

(56) References Cited

U.S. PATENT DOCUMENTS

| 8,096,884 | B2 * | 1/2012 | Beadell .................. G07F 17/32 463/46 |
| 2002/0183106 | A1 | 12/2002 | Cole |
| 2005/0130746 | A1 * | 6/2005 | Stephenson ......... G07F 17/3216 463/46 |
| 2006/0073900 | A1 * | 4/2006 | Cole ....................... G07F 17/32 463/46 |

(Continued)

FOREIGN PATENT DOCUMENTS

| DE | 9320219 | 3/1994 |
| EP | 2328130 | 6/2011 |

(Continued)

OTHER PUBLICATIONS

International Search Report for PCT/EP2013/076351, English translation attached to original, Both completed by the European Patent Office on Feb. 27, 2014, 5 Pages.

*Primary Examiner* — Tramar Harper
(74) *Attorney, Agent, or Firm* — Brooks Kushman P.C.

(57) ABSTRACT

A gaming device having a vertical housing for receiving a game sequence controller, an upper front flap and a lower front flap, the upper front flap being used to mount at least one screen for displaying games that can be controlled using the game sequence controller and the two front flaps being mounted on the vertical housing such that they can pivot in opposite directions to one another and being lockable relative to one another when closed.

10 Claims, 2 Drawing Sheets

(56) References Cited

U.S. PATENT DOCUMENTS

Figure 1:
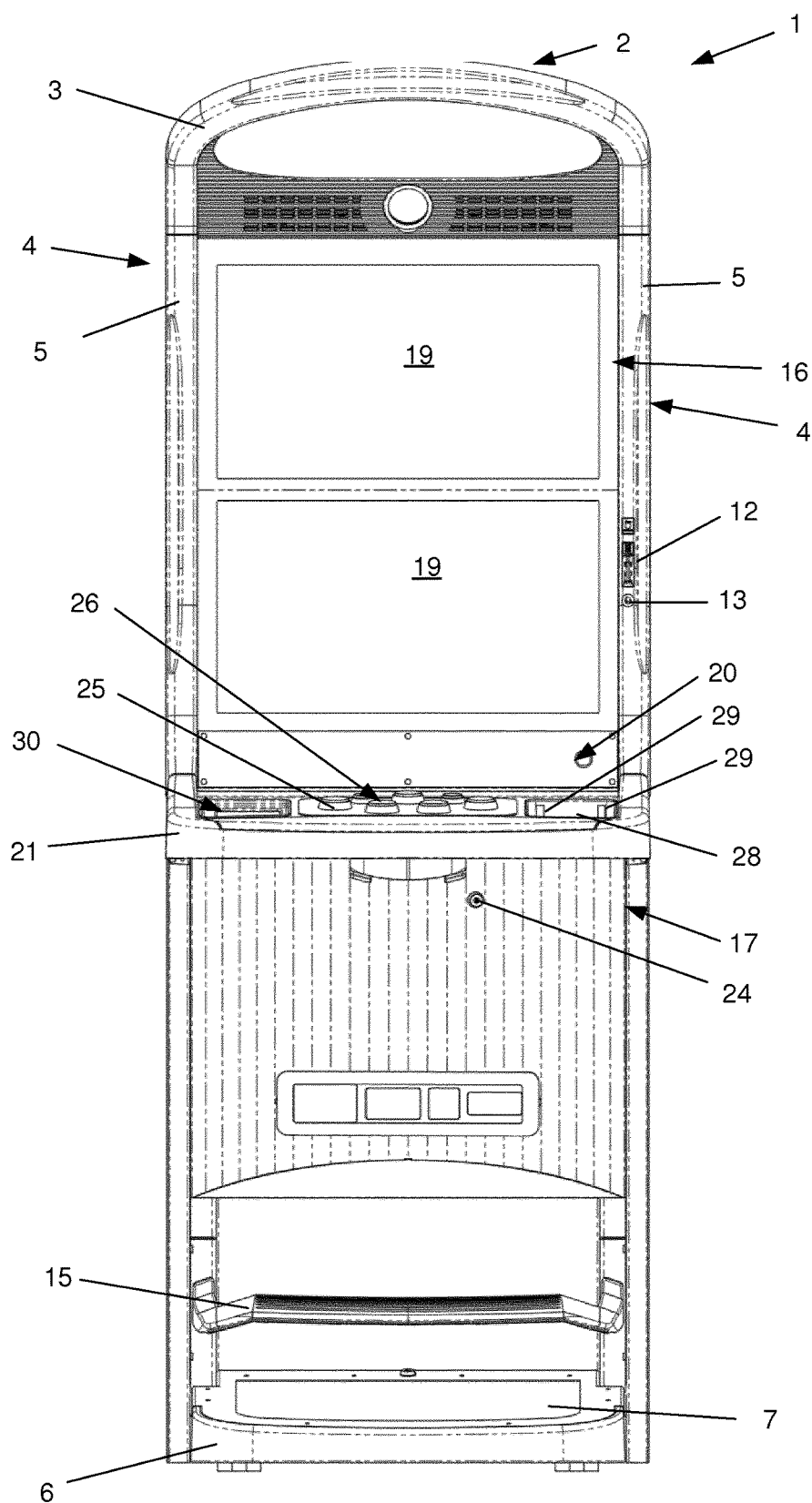

| | | | |
|---|---|---|---|
| 2006/0287112 A1* | 12/2006 | Mallory | G07F 17/3216 463/46 |
| 2008/0113709 A1 | 5/2008 | Beadell et al. | |
| 2008/0119289 A1* | 5/2008 | Lind | G07F 17/3216 463/46 |
| 2008/0132340 A1 | 6/2008 | Haga et al. | |
| 2014/0087868 A1* | 3/2014 | Rosander | G07F 17/3216 463/31 |

FOREIGN PATENT DOCUMENTS

| | | |
|---|---|---|
| GB | 2443909 | 5/2008 |
| JP | 2009233127 | 10/2009 |
| WO | 2008061136 | 5/2008 |

* cited by examiner

GAMING DEVICE COMPRISING A VERTICAL HOUSING

CROSS-REFERENCE TO RELATED APPLICATION

This application is the U.S. national phase of PCT Application No. PCT/EP2013/076351 filed on Dec. 12, 2013, which claims priority to DE Patent Application No. 10 2012 112 341.1 filed on Dec. 14, 2012, the disclosures of which are incorporated in their entirety by reference herein.

The invention relates to a gaming device comprising a vertical housing for receiving a game sequence controller, an upper front flap and a lower front flap, wherein the upper front flap serves for holding at least one screen for depicting games controlled with the game sequence controller.

A gaming device of this type is known in practice. As a rule, the screen is installed fixedly in the front flap which is arranged on the upper side on the vertical housing via hinges in order, in the open state of the upper front flap, to reach into the interior of the vertical housing. There is frequently an operating console between the upper front flap and a housing lower part, said operating console extending over the entire front of the vertical housing and essentially dividing the latter into two. The installation of the individual components of the gaming device proves overall to be relatively difficult since the interior of the vertical housing is difficult to access. Also servicing of the gaming device, which has to be carried out regularly, and a repair which may be required proves to be unergonomic because of the opening having relatively small dimensions.

Furthermore, US 2002/0183106 A1 and US 2008/0113709 A1 both disclose gaming devices with a housing, on the front side of which an upper front flap and a lower front flap are arranged so as to be pivotable in an opposed manner.

The invention is based on the object of providing a gaming device of the type mentioned at the beginning which can be opened spaciously and is therefore configured so as to be installation-, service- and repair-friendly and has an appearance which can be configured in diverse ways.

According to the invention, the object is achieved by the features of independent claim 1.

The dependent claims constitute advantageous refinements of the invention.

A gaming device comprises a vertical housing for receiving a game sequence controller, an upper front flap and a lower front flap, wherein the upper front flap serves for holding at least one screen for depicting games controlled with the game sequence controller. The two front flaps are mounted on the vertical housing so as to be pivotable in an opposed manner and are lockable relative to each other in the closed state.

The upper and the lower front flap are fastened pivotably to the vertical housing in such a manner that, in the open state, said front flaps open up substantially the entire front of the gaming device between their pivot axes, which are arranged close to an upper edge and close to a lower edge of the vertical housing, after which all of the components of the gaming device are freely accessible. Owing to the possibility of easily reaching the components in the interior of the vertical housing, the installation of said components, interchanging same in the event of changed requirements or during repair, and device servicing are easily possible. Of course, the arrangement of the pivot axes of the two front flaps substantially parallel to an upper edge and to a lower edge of the vertical housing takes place in each case directly adjacent to said edges in order to configure the opening which is to be opened up to be as extensive as possible. The arrangement of the two front flaps which are pivotable in an opposed manner leaves relatively large scope for the design of the gaming device which can have, for example, an approximately curved front side or a front side with contours sloping in an opposed manner. At least in the closed state, the two front flaps are lockable relative to each other, for which purpose a fold can be formed, for example, on at least one of the front flaps so that the other front flap is overlapped in regions by means of an adjacent free edge. For the locking relative to each other it is also possible to arrange overlapping means on at least one of the front flaps or locking elements which are effective between the two front flaps. In addition to depicting the games which are stored in a storage module assigned to the computer-controlled game sequence controller, the screen also serves, of course, for displaying information or other entertainment contents.

In a refinement, the lower front flap comprises a console which projects over the front side of the gaming device and has operating elements. In the closed state of the lower front flap, the operating elements are located in a position sloping down from the front side of the gaming device to the free end of the console such that the console provides a comfortable hand support surface for the user of the gaming device. Furthermore, the essential operating elements which are to be connected to the game sequence controller are arranged in the console in a spatially concentrated manner, and therefore the wiring thereof can take place with little outlay and a clearly laid out wiring harness. By means of the compact combining of the operating elements in the console which, when a lower front flap is open, is freely accessible from its rear side, the installation of the said operating elements and optionally replacement are also possible. The operating elements can be combined in a construction unit arranged in the console, and therefore the gaming device, for example by means of a change of the construction unit can be supplied for a new use in the game sphere. For example, a construction unit which has a steering wheel and optionally further operating elements can be exchanged for a construction unit comprising a joystick. Defective and/or broken construction units are also replaceable with a manageable outlay on installation. Expediently, the operating elements are assigned illuminating elements which can be designed as LEDs and can be activatable by the game sequence controller. In particular, use can be made of what are referred to as RGB-LEDs which emit light in different colors.

In order to control the operating elements and/or illuminating elements, the game sequence controller comprises a control device which is connected, for example, to a master which communicates in real time via a two-wire connection with operating elements and/or illuminating elements in the form of slaves. The control device can be completely integrated in the game sequence controller or can be connected thereto without departing from the scope of the invention. Accordingly, the communication no longer takes place via a multi-wire wiring harness, which is, of course, not ruled out in conjunction with the present invention, but rather takes place by means of a type of field bus using a master/slave transmission system via just two lines that have polarity reversal protection, wherein the master can activate a multiplicity of flexibly arrangeable slaves that are connected to the master for example by looping though, in star form, tree form or in such combinations thereof. The topology is freely selectable and hence very flexible to wire. The slaves are of course physically connected in parallel. The control device or the game sequence controller transmits, for example, game-specific data, or information, to the master and receives data for the slaves from the master, the slaves having device IDs, that is to say explicit identifiers, with it being possible to allocate a shared device ID to a plurality of pushbutton switches such that the master recognizes when a key has been pushed for all of the pushbutton switches having the same device ID when a pushbutton switch has been operated. A slave in programmable form can be allocated an arbitrary address, for example, and it is possible to store signal trains, particularly for the purpose of actuating the LEDs, for example in a flashing mode or in the form of what is known as a moving picture for animating a user of the gaming device. The two-wire connection can be designed to have polarity reversal protection and can comprise a plug connection which permits easy separation and therefore simple and rapid replaceability of the operating elements and/or illuminating elements.

Expediently, the game sequence controller is coupled to a housing-side bill processing unit which, when the lower front flap is closed, is connected to a bill input/bill output shell integrated in the console. If, for example, the gaming device is intended to be used in a market with a certain currency, the bill processing unit can simply be replaced or installed in the open state of the lower front flap for the purpose of adaptation to the particular currency, wherein the possibility of reaching in the vertical housing, which is freely accessible from the front when the lower front flap is open, can be brought about in a simple manner. The bill processing unit can be equipped with a bill box and/or a dispenser. When the lower front flap is closed, the bill input/bill output shell which is accommodated in the console and has a slot for a bill to be introduced is operatively connected to the bill processing unit in such a manner that the bill inserted into the slot reliably passes into the bill processing unit for further conveying and processing. The bill input/bill output shell accommodated in the console makes it easier to input and supply bills for payment and ensures that bills paid out are easily reachable in the viewing and access region for the user of the gaming device. Of course, previously explained bills cannot only be bills, but also the use of certain tickets or prepaid cards or coupons is also possible. It is also conceivable to couple the game sequence controller to a card reader in order, for example, to debit a use of a game from a chip, a magnetic strip or the like or from a bank account.

A money output shell is preferably embedded in the console, which money output shell, when the lower front flap is closed, is connected via a coin channel to the money processing unit installed on the housing side. The money output shell is therefore located in the immediate viewing and access region for the user of the gaming device. In addition to the output of money, other leaf-shaped items, for example vouchers or the like, can also be output at this point.

In a further refinement, the game sequence controller is coupled to a housing-side money processing unit, which comprises a coin accepter unit, a coin box and a coin payout unit, wherein the coin accepter unit is connected via a coin shaft to a coin insertion slot accommodated in a frame of the vertical housing. The coin insertion slot is accordingly accommodated in a component which is immovable in relation to the further coin processing unit, namely in the frame of the vertical housing, and therefore the distances which the coin has to cover to the box are produced so as to be relatively short and direct and accordingly without annoying transitions or connections, as a result of which malfunctions in this region of the gaming device are reliably avoided. The coins do not absolutely have to be money coins; the use of tokens or the like is also conceivable.

So that the user of the gaming device easily reaches the coin insertion slot, the coin insertion slot is arranged in the region of the upper front flap. Accordingly, the coin insertion slot is located in the viewing region of the user and is easy to reach.

In order to provide reliable guard control with as few engagement points for break-open attempts as possible, when the front flaps are closed, the lower front flap overlaps a free lower portion of the upper front flap and a locking mechanism is effective. Of course, the two flaps are accommodated in the vertical housing with relatively small gap sizes. Expediently, a locking part of the locking mechanism is inserted into the console and is connected to a lock in the lower front flap, and mating locking parts are fastened in side walls of the vertical housing.

In an advantageous manner, the upper front flap holds two screens arranged one above the other, wherein each screen is connected to the game sequence controller. Accordingly, a clear functional separation is provided between the components installed in the upper front flap and the lower front flap.

The upper front flap and/or the lower front flap are preferably connected to the vertical housing via hinge elements, preferably in a replaceable manner. The hinges can be equipped, for example, with a type of rapid closure so that a simple change can be implemented.

A standing foot is preferably provided, between which standing foot and the hinge elements for the lower front flap a foot rest is arranged. Accordingly, the user can use the gaming device in a comfortable body position by being able, when standing, to rest one foot on the foot rest or, when sitting, for example on a bar stool or similar high chair, to be able to rest both feet on the foot rest. For the visual animation of the user, the standing foot and/or the foot rest are designed to be illuminable.

It goes without saying that the features mentioned above and those which have yet to be explained below can be used not only in the respectively stated combination but also in different combinations. The scope of the invention is defined only by the claims.

Figure 2:
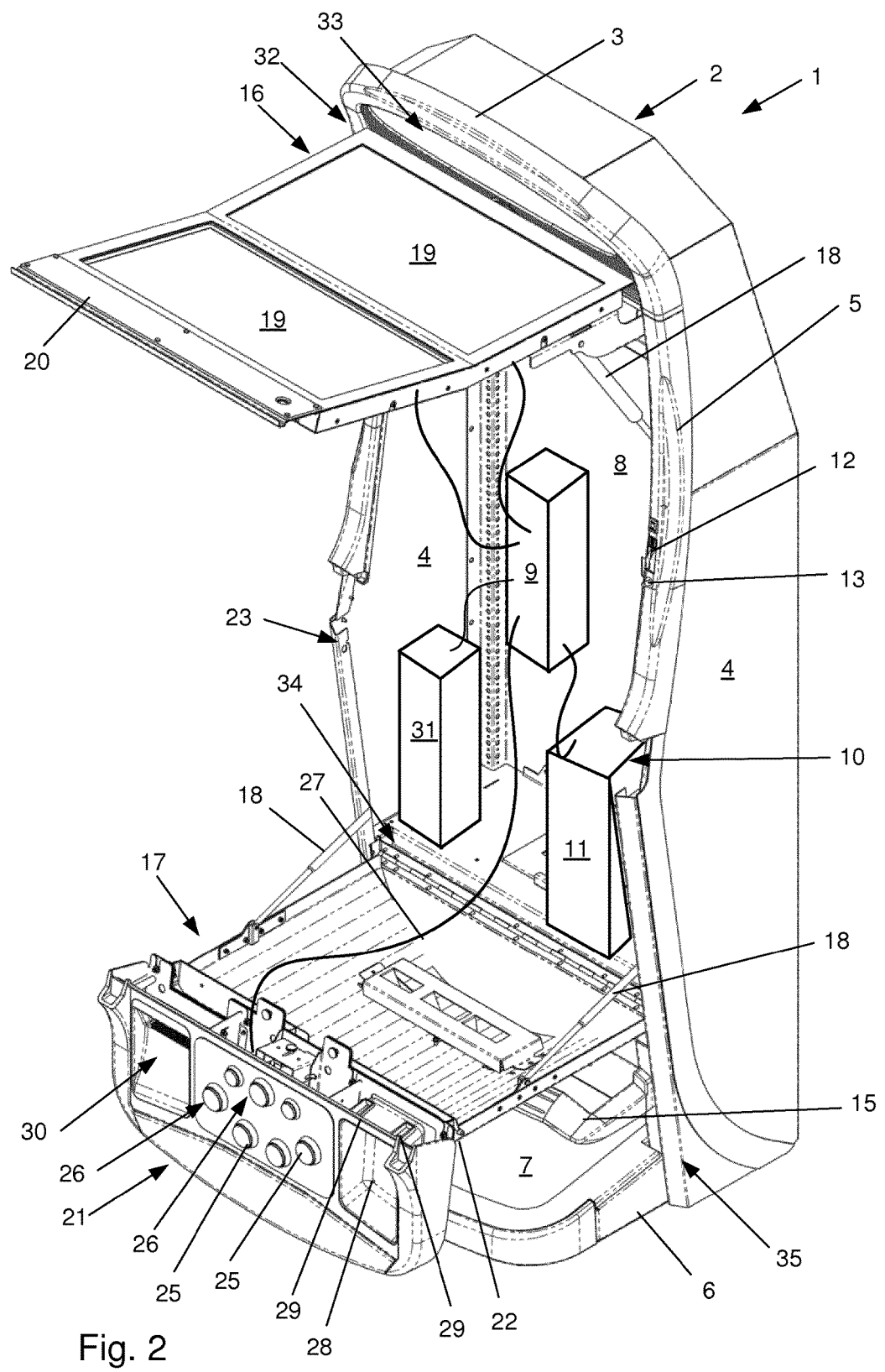

The invention is explained in more detail below using an exemplary embodiment with reference to the associated drawing, in which:

FIG. 1 shows a simplified perspective illustration of a vertical housing of a gaming device according to the invention with an open front door, and FIG. 2 shows a front view of the gaming device according to FIG. 1 with a closed front door.

The gaming device comprises a vertical housing 1 with an upper-side head part 2 having a curved frame part 3, two opposite side walls 4, to which frames 5 are assigned on the end sides, a standing foot 6 with a cover panel 7 which can be backlit, and, of course, a rear wall 8. The vertical housing 2 accommodates a game sequence controller 9 which is coupled to a money processing unit 10, wherein the money processing unit 10, which can also be designed as a token processing unit, comprises a coin acceptor unit (not illustrated specifically), a coin box and a coin payout unit. The coin acceptor unit is connected via a coin shaft, which is accommodated behind the associated frame 5, to a coin insertion slot 12 installed in the frame 5. Below the coin insertion slot 12, a return button 13 is located in the frame 5 in order to pay out money and/or tokens in a known manner. A foot rest 15 which is configured in the form of a bar and extends over the entire width of the front of the vertical housing 1 is provided between the standing foot 6 and a base plate 14 of the vertical housing 1 of the gaming device.

In order to close the vertical housing 1, an upper front flap 16 and a lower front flap 17 are provided which front flaps are coupled so as to be pivotable in an opposed manner via corresponding hinges in the vertical housing 1 directly below the head part 2 and directly above the base plate 14. In a corresponding manner, a pivot axis 32 of the upper front flap 16 runs parallel to an upper edge 33 of the vertical housing 1 and a pivot axis 34 of the lower front flap 17 runs parallel to a lower edge 35 of the vertical housing 1, wherein the pivot axes 32, 34 are in each case arranged directly adjacent to the upper edge or lower edge. Furthermore, damping elements 18 extend in each case between the side walls 4 of the vertical housing 1 and the upper front flap 16 and the lower front flap 17, the damping elements 18 facilitating a pivoting of the front flaps 16, 17 and ensuring that same are held in an open position.

The upper front flap 16 accommodates two screens 19 which are arranged one above the other, serve for depicting game contents and/or other visually perceptible contents and are connected to the game sequence controller. The screens 19 can be configured arbitrarily, in particular as TFT, and/or LED and/or OLED and/or plasma displays or the like. In the closed state of the vertical housing 1, i.e. when the upper front flap 16 and the lower front flap 17 are folded in and lie between the frames 5, the edge of the lower front flap 17 overlaps a free lower portion 20 of the upper front flap 16, and a locking mechanism is effective, which locking mechanism comprises a locking part 22 which is inserted into a console 21 of the lower front flap 17, interacts with mating locking parts 23 in the opposite side walls 4 of the vertical housing 1 and is connected to a lock 24.

The console 21 is located on an upper edge of the closed lower front flap 17 and projects beyond the front thereof in such a manner that a user can place his hands thereon. A plurality of operating elements 26 which are designed as pushbutton switches 25 and are equipped with illuminating elements (not illustrated) are located approximately centrally in the console 21. In order to control the operating elements 26 and/or illuminating elements or for the interchange of data or signals, the game sequence controller 9 comprises a control device which is connected to a master which communicates in real time via a two-wire connection 27 with the operating elements 26 and/or illuminating elements in the form of slaves. Accommodated in the console 21 to the sides of the operating elements 26 is, on one side, a money output shell 28 which, in the closed state of the lower front flap 17, is operatively connected to the money processing unit 10 via slots 29 for coins, and, on the other side, a bill input/bill output shell 30, which has a bill slot and, in the closed state of the lower front flap 17, is connected to a bill processing unit 31 accommodated in the vertical housing 1, wherein the bill processing unit 31 comprises, for example, a bill box and/or a dispenser and is connected to the game sequence controller 9. Of course, the bill processing unit 31 can also be replaced or supplemented by a coupon or voucher processing unit.

By means of the front flaps 16, 17 which are arranged so as to be pivotable in an opposed manner, the vertical housing 1 can be opened spaciously and an installation or a repair of the gaming device or servicing of the gaming device or of the components thereof, in particular the bill processing unit 31 and/or the money processing unit for coin money or the associated boxes and/or dispensers for coins or bills, is relatively simple to implement.

| List of reference numbers | |
|---|---|
| 1. | Vertical housing |
| 2. | Head part |
| 3. | Frame part |
| 4. | Side wall |
| 5. | Frame |
| 6. | Standing foot |
| 7. | Cover panel |
| 8. | Rear wall |
| 9. | Game sequence controller |
| 10. | Money processing unit |
| 11. | Coin box |
| 12. | Coin insertion slot |
| 13. | Return button |
| 14. | Base plate |
| 15. | Foot rest |
| 16. | Upper front flap |
| 17. | Lower front flap |
| 18. | Damping element |
| 19. | Screen |
| 20. | Portion of 16 |
| 21. | Console |
| 22. | Locking part |
| 23. | Mating locking part |
| 24. | Lock |
| 25. | Pushbutton switch |
| 26. | Operating element |
| 27. | Two-wire connection |
| 28. | Money output shell |
| 29. | Slot |
| 30. | Bill input/bill output shell |
| 31. | Bill processing unit |
| 32. | Pivot axis |
| 33. | Upper edge |
| 34. | Pivot axis |
| 35. | Lower edge |

The invention claimed is:

1. A gaming device comprising a vertical housing for receiving a game sequence controller, an upper front flap and a lower front flap, wherein the upper front flap serves for holding at least one screen for depicting games controlled with the game sequence controller, and the two front flaps are mounted on the vertical housing so as to be pivotable in an opposed manner and are lockable relative to each other in a closed state, wherein the lower front flap comprises a console which projects beyond the front side of the gaming device and has operating elements, wherein the game sequence controller is coupled to a housing-side bill processing unit, which, when the lower front flap is closed, is connected to a bill input/bill output shell integrated in the console, and is further coupled to a housing-side money processing unit, which comprises a coin accepter unit, a coin box and a coin payout unit, wherein a money output shell is embedded in the console, which money output shell, when the lower front flap is closed, is connected via a coin channel to the money processing unit installed on the housing side.

2. The gaming device as claimed in claim 1, wherein a pivot axis of the upper front flap runs parallel to an upper edge of the vertical housing and a pivot axis of the lower front flap runs parallel to a lower edge of the vertical housing.

3. The gaming device as claimed in claim 1, wherein the upper front flap and the lower front flap in the open state open up the entire front side of the gaming device between the pivot axes.

4. The gaming device as claimed in claim 1, wherein the coin accepter unit is connected via a coin shaft to a coin insertion slot accommodated in a frame of the vertical housing.

5. The gaming device as claimed in claim 4, wherein the coin insertion slot is arranged in the region of the upper front flap.

6. The gaming device as claimed in claim 1, wherein, when the front flaps are closed, the lower front flap overlaps a free lower portion of the upper front flap and a locking mechanism is effective.

7. The gaming device as claimed in claim 1, wherein a locking part of the locking mechanism is inserted into the console and is connected to a lock in the lower front flap, and mating locking parts are fastened in side walls of the vertical housing.

8. The gaming device as claimed in claim 1, wherein the upper front flap holds two screens arranged one above the other, wherein each screen is connected to the game sequence controller.

9. The gaming device as claimed in claim 1, wherein the upper front flap and/or the lower front flap are connected to the vertical housing via hinge elements, preferably in a replaceable manner.

10. The gaming device as claimed in claim 1, wherein a standing foot is provided, between which standing foot and the hinge elements for the lower front flap a foot rest is arranged.

* * * * *